Oct. 15, 1957 E. T. ARMSTRONG 2,809,392
APPARATUS FOR EMBOSSING THERMOPLASTIC FILM
Filed June 15, 1954
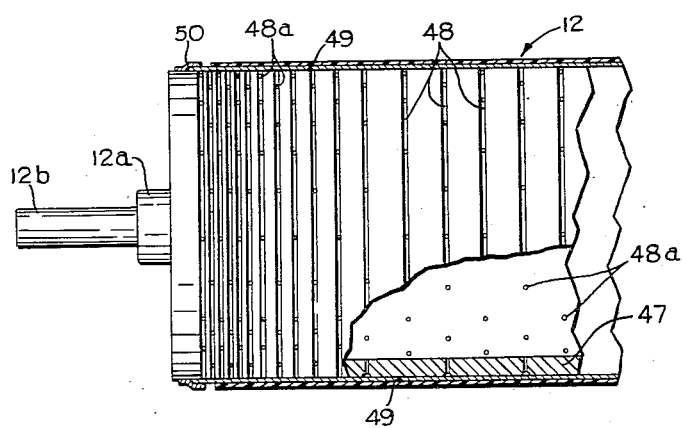
INVENTOR.
EDWARD T. ARMSTRONG
BY
Oldham & Oldham
ATTORNEYS

United States Patent Office 2,809,392
Patented Oct. 15, 1957

2,809,392

APPARATUS FOR EMBOSSING THERMOPLASTIC FILM

Edward T. Armstrong, Cupsaw Lake, Wanaque, N. J., assignor to Toscony Fabrics, Inc., Passaic, N. J.

Application June 15, 1954, Serial No. 436,963

2 Claims. (Cl. 18—19)

This invention relates to vacuum drum apparatus for continuously embossing heat-sensitive plastic film.

It has been discovered that the radial and transverse permeability of the vacuum drum during embossing are unusually critical. To achieve embossing to the extreme edges of the material it is highly advisable to provide very high radial permeability in this region at either side of the vacuum drum. It is very desirable to minimize the transverse permeability to reduce infiltration of air toward the central region of the film material. To maintain an almost uniform embossing force distribution, it is recommended to reduce the radial permeability of the drum rapidly from the edges of the material to the center of the mateerial. Finally, it is advisable to provide regions of maximum radial permeability at either edge of the material embossed, to allow for variations in the width and position of the material embossed on the vacuum drum.

It is the general object of the invention to provide a vacuum drum especially designed to emboss heat softened film with a minimum of vacuum loss and utilizing minimum pressure, and characterized by simplicity of construction and uniformity of embossing action from end to end of the drum.

In the drawings:

The single figure is a fragmentary elevation, and partly in section, of the vacuum drum of the invention.

It will be understood that the invention is capable of operation upon a wide variety of web or film-like materials which are sensitive to heat, but is primarily concerned with embossing organic, thermoplastic, relatively thin films of vinyl, polyamide, acetate, polyethylene, rubber hydrochloride and the like and derivatives and polymers thereof, usually, but not necessarily, without fabric or other backing or reinforcing. The term "film" employed for the sake of simplicity throughout the remainder of the specification and in the claims is intended to include the various materials and structures enumerated.

The vacuum drum 12 illustrated comprises in the form shown a cast, extruded, or rolled hollow shell 47, of aluminum or other corrosion resistant metal, closed at each end and provided with bearing trunnions 12a and shafts 12b. The shell 47 is provided with a plurality of circumferential grooves 48, and an important part of the invention is that these grooves are positioned progressively closer together towards the ends of the drum in the manner clearly illustrated. This has been found to insure uniform embossing action to the very edges of the film which is not obtained with uniform groove spacing. Holes 48a, usually about 1/16 inch in diameter, are drilled through the shell 47 at circumferentially spaced points in the grooves 48. Surrounding the shell 47 of the drum 12 is an air pervious pattern 49 usually of fabric, and constituting any one of a plurality of widely variable designed, textures and the like. The edges of the pattern 49 are sealed to the drum by masking tape 50 or other sealing means. Air is evacuated from the drum 12 through a hole in one of the shafts 12b by suitable rotary connection means in the use of the apparatus.

While there is above disclosed but one embodiment of the invention herein presented, it is possible to produce still other embodiments without departing from the inventive concept herein disclosed, and it is desired therefore that only such limitations be imposed on the appended claims as are stated therein.

What is claimed is:

1. A vacuum drum for embossing thermoplastic film comprising closed ends and a cylindrical shell of corrosion resistant material, said shell having a plurality of circumferentially extending grooves, the grooves being closer together towards the ends of the drum, said shell having openings from the grooves to the inside of the shell, a porous cover over the shell for imparting an embossed design to the film, means for creating a reduced pressure inside the shell.

2. A vacuum drum for embossing plastic film and including a hollow cylinder having closed ends, a pervious cover on the cylinder for imparting an embossed design, the cylinder having openings from its inside to the cover, the openings being progressively more numerous towards the ends of the cylinder.

References Cited in the file of this patent

UNITED STATES PATENTS

| | | |
|---|---|---|
| 971,176 | Dexter | Sept. 27, 1910 |
| 2,317,447 | Domizi | Apr. 27, 1943 |
| 2,483,021 | Oaks | Sept. 27, 1949 |
| 2,493,439 | Braund | Jan. 3, 1950 |
| 2,513,852 | Donofrio | July 4, 1950 |
| 2,516,199 | Fry | July 25, 1950 |
| 2,551,005 | Johnson | May 1, 1951 |
| 2,660,757 | Smith et al. | Dec. 1, 1953 |
| 2,696,679 | Cram | Dec. 14, 1954 |
| 2,776,451 | Chavannes | Jan. 8, 1957 |
| 2,776,452 | Chavannes | Jan. 8, 1957 |